United States Patent
Wakuda et al.

(10) Patent No.: US 6,515,816 B1
(45) Date of Patent: Feb. 4, 2003

(54) MEDIUM DISTINGUISHING METHOD OF A DISK USED IN A DISK DRIVE

(75) Inventors: Hiroshi Wakuda, Fukushima-ken (JP); Shigeru Yamaguchi, Fukushima-ken (JP); Takayuki Sugawara, Fukushima-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/265,231

(22) Filed: Mar. 8, 1999

(30) Foreign Application Priority Data

Mar. 9, 1998 (JP) .......................................... 10-056704

(51) Int. Cl.7 .......................... G11B 15/18; G11B 27/36; G11B 15/04; G11B 15/46
(52) U.S. Cl. ....................... 360/69; 360/31; 360/73.03; 360/60
(58) Field of Search ............................. 360/69, 60, 75, 360/31, 73.03

(56) References Cited

U.S. PATENT DOCUMENTS

| 5,777,813 A | * | 7/1998 | Sun et al. ...................... 360/66 |
| 5,953,176 A | * | 9/1999 | Shimazu et al. .......... 360/69 X |
| 5,995,344 A | * | 11/1999 | Fukuda et al. ............... 360/133 |

FOREIGN PATENT DOCUMENTS

JP     A1 9-63241     3/1997

* cited by examiner

*Primary Examiner*—Andrew L. Sniezek
(74) *Attorney, Agent, or Firm*—Brinks Hofer Gilson & Lione

(57) ABSTRACT

The radius range of a formatted zone in each medium differs. A floppy disk and an another-standard high-capacity medium are distinguished by reading a reproduction output at an inside position in the formatted zone by heads. Since the another-standard high-capacity medium has a formatted zone starting from a more inside position than that for the floppy disk, both media can be distinguished by reading a reproduction output by the heads to check a difference in the inside position of the formatted zone.

7 Claims, 7 Drawing Sheets

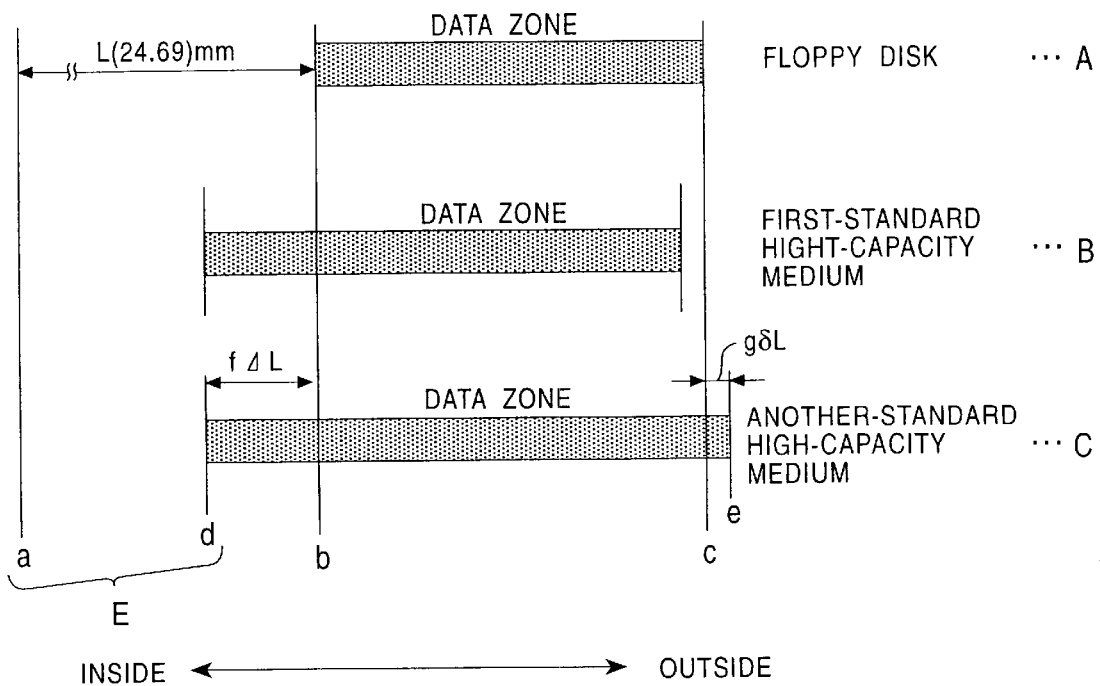

MEDIUM DISTINGUISHING METHOD OF A DISK USED IN A DISK DRIVE

BACKGROUND OF THE INVENTION

1. Field of the Invention

The present invention relates to a medium distinguishing method used for a disk drive into which a low-capacity disk and a high-capacity disk can be loaded, the distinguishing method allowing a medium which cannot be distinguished from the low-capacity disk when mounted to be determined to be either a low-capacity disk or a high-capacity disk.

2. Description of the Related Art

Floppy disks (hereinafter called FDs) having a capacity of 1 MB or 2 MB (hereinafter referred to as 1/2 MB) have been generally used as media for recording computer data. As data becomes large due to recent large-capacity application software for personal computers, a high-capacity disk (hereinafter called a first-standard high-capacity medium) having a high capacity of 200 MB, which is far larger than that of a FD, has been developed. It is assumed that a drive for this high-capacity medium can record and reproduce data into and from both of the first-standard high-capacity medium and the conventional 1/2-MB low-capacity disk (FD). The The first-standard high-capacity medium is accommodated into a hard case and loaded into the drive. This hard case is nearly the same as that for the conventional FD in shape and size. Since, precisely, the hard cases of the first-standard high-capacity medium and the FD differ in shape to allow them to be physically identified, however, when the first-standard high-capacity medium is inserted to the dedicated drive, the drive recognizes the medium immediately and performs recording or reproduction with the use of a head dedicated to the medium. When the FD is inserted, it is expected that the drive recognizes the FD and performs recording or reproduction with the use of a head dedicated to the FD.

In the dedicated drive, the head for the conventional FD and the head for the first-standard high-capacity medium are mounted in a common slider with separate processing circuits being connected to these heads.

Drives have been commercially available already which can record and reproduce data into and from another medium (hereinafter called another-standard high-capacity medium) having a capacity of 120 MB, those drives serving as upper compatible devices with FD drives.

Since this another-standard high-capacity medium is almost the same as the FD in terms of the shapes and the sizes of their hard cases, if the another-standard high-capacity medium is inserted into a drive dedicated to the first-standard high-capacity medium, the drive cannot determine whether the inserted medium is an another-standard high-capacity medium or an FD. The hard case of an FD has a square hole used for enabling or disabling a write operation while the hard case of an another-standard high-capacity medium is solid at the portion corresponding to the square hole. Therefore, when an another-standard high-capacity medium is inserted into a drive dedicated to the first-standard high-capacity medium, the drive recognizes that an FD to which writing is disabled has been inserted.

On the other hand, since tracking servo with the use of optical servo is used for the another-standard high-capacity medium whereas optical servo is not used for the first-standard high-capacity medium, a drive dedicated to the another-standard high-capacity medium can identify the first-standard high-capacity medium by recognizing whether an optical servo pattern exists. Therefore, when a drive dedicated to the first-standard high-capacity medium is provided with an optical servo unit, the another-standard high-capacity medium can be identified. However, providing this optical servo unit increases cost and is unrealistic.

It is also possible that when a medium is inserted into a drive dedicated to the first-standard high-capacity medium, a reproduction operation is immediately performed and if a signal having the format unique to the first-standard high-capacity capacity medium or a signal having the format unique to the FD is reproduced, the medium is recognized as such, or if a signal is not reproduced as either of the above, the medium is determined to be an another-standard high-capacity medium.

In this determination method, however, since a read signal needs to be sent to the host computer and signal processing is required for determination, it takes some time. In addition, when a medium is inserted, since two types of operations are required, one for reproduction operation by rotating the medium at a low speed corresponding to the FD and the other for reproduction operation by rotating the medium at a high speed corresponding to the first-standard high-capacity medium, prompt determination is difficult. Furthermore, since operation-control processing for determination is complicated, the load of a control circuit, including the CPU, increases.

SUMMARY OF THE INVENTION

The present invention has been made to solve the above problems. Accordingly, it is an object of the present invention to provide a medium distinguishing method in which a drive easily distinguishes low-capacity disks appropriate for the drive to receive and other media which the drive needs to reject.

The foregoing object is achieved in one aspect of the present invention through the provision of a medium distinguishing method for a disk drive which allows recording and reproduction to be performed for a low-capacity disk and a high-capacity disk, which is provided with identifying means for identifying the low-capacity disk and the high-capacity disk loaded, and which can mount another medium which cannot be distinguished from the low-capacity disk when loaded, wherein, when the loaded medium is not determined to be a high-capacity disk, a difference in the recording condition of the medium is detected by the use of a head to distinguish the low-capacity disk and the another medium.

As described above, a medium distinguishing method according the present invention allows the floppy disk and the another-standard high-capacity medium which cannot be distinguished physically to be distinguished with the use of the medium magnetic characteristics.

In this case, the distinction can be made by the use of a difference in radius range used or a difference in track pitch in data recording zones.

For example, the formatted area of the another-standard high-capacity medium is formed wider than that of the FD in the inside direction and the outside direction.

Therefore, a reproduction output is read by a head and a difference in the used radius range of a data zone or a formatted zone is detected to distinguish both media.

In this case, a reproduction output of the loaded medium is detected by a head provided for the drive to determine a difference in the inside used-radius position or the outside used-radius position.

To determine a difference at an inside position with the above means, the head is first moved to a position more inside than the innermost position of the data zone or the formatted zone, the head is then sequentially moved outside from that position, and a reproduction output of the medium is read.

Since the another-standard high-capacity medium has a data zone or a formatted zone starting from a position more inside than that in the FD, when a reproduction output is obtained by the use of a head at an inside position more inside than the innermost position of the data zone of the FD, the loaded medium is determined to be an another-standard high-capacity medium and it is ejected from the drive.

Even in a case in which a difference is detected at an outside position, when a reproduction output is obtained at a position more outside than the outermost position of the data zone or the formatted zone of the FD, the loaded medium is determined to be an another-standard high-capacity medium and it is ejected from the drive. A difference in track pitch may be used to identify the loaded medium.

A drive for the first-standard high-capacity medium is provided with both heads for a high-capacity disk and a low-capacity disk. Both heads are mounted on a common slider.

When a reproduction operation is performed with the use of the head for a high-capacity disk to identify the loaded medium, a reproduction output of the head can be detected by the use of a tracking-servo-signal detection section provided for a reproduction path for the head. Since the tracking-servo-signal detection section is used, a special circuit for detecting a reproduction output (envelope) is unnecessary.

In this case, when a disk which needs distinction is loaded, the loaded medium is rotated at a high speed such as 3600 rpm and a reproduction output is detected as an envelope to perform the above distinction.

Alternatively, a reproduction operation is performed with the use of the head for a low-capacity disk to identify the loaded medium, and a reproduction output of the head is detected by the use of an envelope detection circuit added to a reproduction path for the head.

In this case, when a disk which needs distinction is loaded, the loaded medium is rotated at a low speed such as 300 rpm and a reproduction output is detected as an envelope.

The foregoing object is achieved in another aspect of the present invention through the provision of a medium distinguishing method for a disk drive which allows recording and reproduction to be performed for a low-capacity disk and a high-capacity disk, which is provided with identifying means for identifying the low-capacity disk and the high-capacity disk loaded, and which can mount another medium which cannot be distinguished from the low-capacity disk when loaded, wherein, when the loaded medium is not determined to be a high-capacity disk, high-frequency determination data is recorded at an area more inside than the data zone and it is determined whether the determination data can be read in a reproduction operation to distinguish the low-capacity disk and the another medium.

As described above, the floppy disk and the another-standard high-capacity medium which cannot be distinguished physically are allowed to be distinguished with the use of the medium magnetic characteristics, especially recording characteristics and reproduction characteristics.

When a floppy disk or an another-standard high-capacity medium is inserted into a drive, determination data is written by a head into an unused area located at the innermost position of the inserted medium and where data is not recorded or reproduced at all, and it is determined whether the reproduction output corresponding to the written determination data is obtained to identify the loaded medium.

In this case, the loaded medium is rotated at the low speed corresponding to the rotation frequency of the low-capacity disk, and the determination data is recorded or reproduced by the use of a head for the high-capacity disk. Alternatively, the loaded medium is rotated at the high speed corresponding to the rotation frequency of the high-capacity disk, and the determination data is recorded or reproduced by the use of a head for the high-capacity disk.

Since the FD, which is a low-capacity medium, has a low coercive force and a thick magnetic layer, remanence is small when magnetic recording is performed with a high-frequency signal. Therefore, even if an attempt is made to record a high-frequency signal for the first-standard high-capacity medium into the FD, recording cannot be performed. Consequently, a reproduction output is very weak when such recording and reproduction are performed. On the other hand, since it is expected that a high-frequency signal is recorded into the another-standard high-capacity medium, after high-frequency determination data is written, its reproduction output is obtained. Therefore, by recording and reproduction of the determination data, a low-capacity disk such as the FD and other media which are not to be handled can be distinguished.

BRIEF DESCRIPTION OF THE DRAWINGS

FIG. 1 is a view of the data zone of each medium.

DESCRIPTION OF THE PREFERRED EMBODIMENTS

Figure 2A:
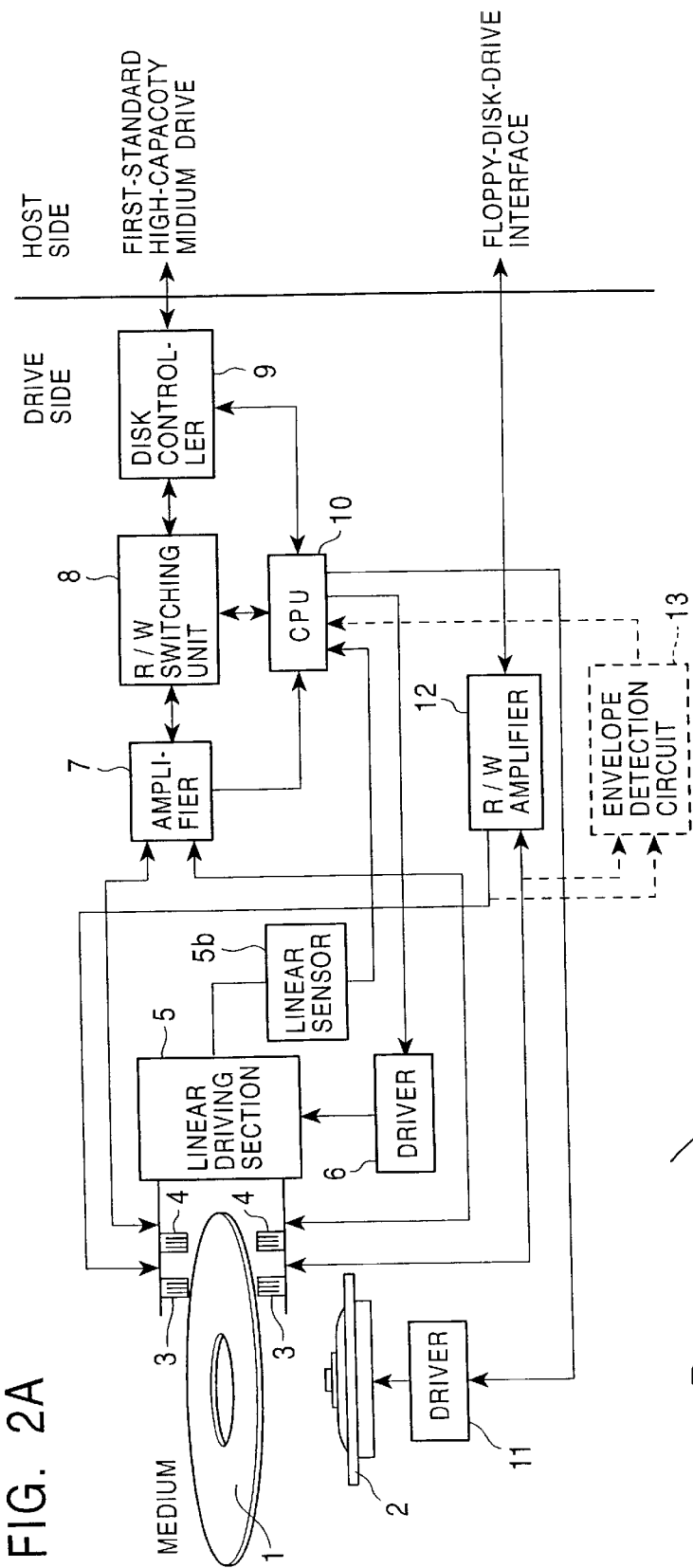
FIG. 2A is a functional block diagram of a drive for a first-standard high-capacity medium.

Medium distinguishing methods of the present invention will be described below by referring to the drawings.

FIG. 1 is a view showing the formatted areas (data zones) of a floppy disk A, a first-standard high-capacity medium B, and an another-standard high-capacity medium C. The present invention uses the magnetic characteristics of the media, especially the recording characteristics, the reproduction characteristics, and the recording positions thereof, to distinguish the media.

The hard case of the first-standard high-capacity medium is provided with a detection section by which a drive can identify the first-standard high-capacity medium when the medium is inserted into the drive. Therefore, a drive dedicated to the first-standard high-capacity medium can immediately identify a first-standard high-capacity medium when the hard case thereof is loaded, and subsequent processing is appropriately performed.

In FIG. 1, "a" indicates the center position of the media, "b" indicates the innermost position (a distance of L from "a") of the data zone of the FD, "c" indicates the outermost position of the data zone of the FD, "d" indicates the innermost position of the data zone of the another-standard high-capacity medium, and "e" indicates the outermost position of the data zone of the another-standard high-capacity medium. These data zones indicate zones where data is recorded and reproduced after the media are formatted.

As shown in FIG. 1, the ranges of the data zones of respective media differ and the media can be distinguished by detecting differences of the radial positions of the data zones.

In a first distinguishing method according to the present invention, since the FD and the another-standard high-capacity medium have different inside and outside positions of the data zones, these media can be distinguished by detecting a difference between the radial positions of the data zones.

To distinguish the media at an inside data zone, the head is first moved to the innermost position of the data zone of the another-standard high-capacity medium, and then the head is moved outside. When a reproduction output is obtained from the inserted medium before the head reaches the "b" position, which indicates the innermost position of the FD, the medium is determined to be an another-standard high-capacity medium. When a reproduction output is not obtained even if the head reaches the "b" position, the medium is determined to be an FD.

On the other hand, to distinguish the media at an outside data zone, when a reproduction output is obtained from the inserted medium at a position between the "c" and "e" positions, the medium is determined to be an another-standard high-capacity medium. When a reproduction output is not obtained at a position outside the "c" position, the medium is determined to be an FD.

As described above, both media can be distinguished at the inside data zone and the outside data zone. It is preferred that they be distinguished at the inside data zone because a radius difference "f" (ΔL) between the innermost positions of the FD and another-standard high-capacity medium is sufficiently larger than a radius difference "g" (δL) between the outermost positions thereof.

The difference "f" (ΔL) is enough longer than the track pitch, 0.2 mm, of the FD, to determine the position where a reproduction output is obtained, either the "d" position or the "b" position, by the use of the movement distance of the magnetic head.

In a second distinguishing method according to the present invention, determination data is written into an unused, inside area (blank area E) shown in FIG. 1 by a head mounted to a drive, and whether the determination data can be read afterwards is determined to identify the medium.

Figure 2B:
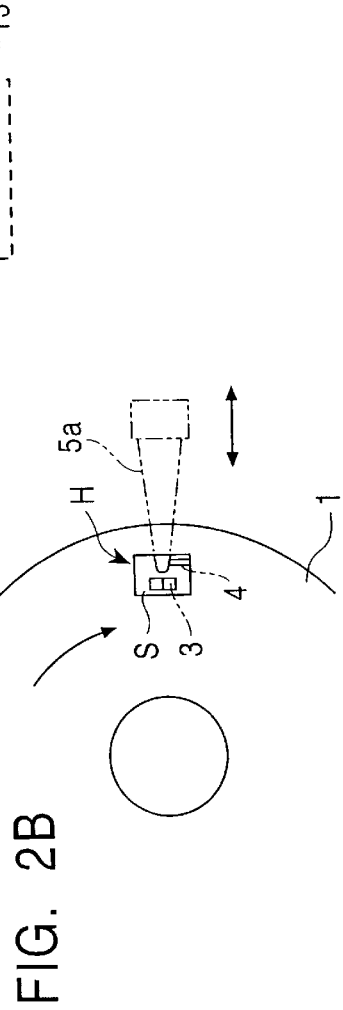
FIG. 2B is a partial plan showing a state in which a head is disposed opposite a medium.

FIG. 2A is a functional block diagram of a drive for the first-standard high-capacity medium, used in a medium distinguishing method according to the present invention. FIG. 2B is a partial plan showing a state in which a magnetic head is positioned opposite to an medium.

When a medium 1 shown in FIGS. 2A and 2B, such as a high-capacity disk (the first-standard high-capacity medium) or a low-capacity disk (the conventional FD having a capacity of 1/2 MB), is inserted to the drive, it is disposed on a turntable on a spindle motor (SPM) 2. The drive is provided with two recording and reproduction heads, an FD head (lower compatible head) 3 and a head 4 for the first-standard high-capacity medium.

As shown in FIG. 2B, in a magnetic head unit H provided for the drive, the head 3 and the head 4 are mounted on a common slider S. The slider S is supported by a support arm 5a and the slider S is pressed against the medium 1 with a relatively light pressure by the elastic force of the support arm 5a. The track width of the FD head 3 is about 131 μm at a recording and reproduction gap and about 63 μm at an erase gap. The track width of the head 4 for the first-standard high-capacity medium is about 7.5 μm.

When the medium 1 is determined to be an FD, the spindle motor 2 rotates at 300 rpm. The slider S slides on the FD medium and a low-frequency signal is recorded and reproduced by the head 3. When the medium is determined to be a first-standard high-capacity medium, the spindle motor rotates at a high speed of about 3600 rpm. At this high-speed rotation, the slider S has a floating posture due to an air flow on the medium and a high-frequency signal is recorded and reproduced at high density by the head 4, which is provided at the trailing end section of the slider S.

The base end section of the support arm 5a is supported by a linear driving section 5. The linear driving section 5 operates under driving control of a linear driving driver 6, and the slider S is driven in the radial direction of the medium 1. The linear driving section 5 is provided with a linear sensor 5b for detecting the distance by which a movable section that supports the support arm 5a moves. The value detected by the linear sensor 5b is sent to a CPU 10, and the CPU 10 recognizes which position the magnetic head 3 or 4 moves on the medium. The CPU 10 also controls the linear driving section 5.

When the lower-compatible head 3 is used, record data is sent to the head 3 from a R/W amplifier 12, or an output of the head 3 is amplified by the R/W amplifier 12. The R/W amplifier 12 is connected to the data processing section of the host computer through a floppy-disk-drive interface of the host computer.

When the head 4 for the first-standard high-capacity medium is used, the CPU 10 serves as a signal processing section in the drive. A recording command or a reproduction command sent from the host computer is sent to a R/W switching unit 8 through a disk controller 9. Due to switching thereof, a signal processing mode specified by the CPU 10 is changed.

Figure 7:
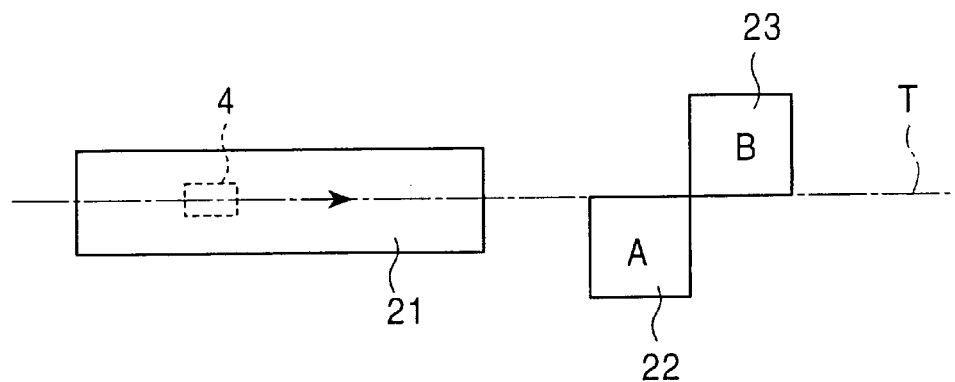
FIG. 7 is a view of a servo pattern of a first-standard high-capacity medium.

In reproduction, signals read by the head 4 are amplified by an amplifier 7 and sent to the CPU 10 through the R/W switching unit 8. Among the signals read by the head 4, a position error signal (PES, a tracking error signal) is sent from the amplifier 7 to the CPU 10. As shown in FIG. 7, at a plurality of predetermined positions in recording tracks on a recording surface of the first-standard high-capacity medium, an advance-notice signal 21 indicating that the position is a servo area is recorded, and is followed by a burst A signal 22 and a burst B signal 23. The CPU 10 detects the burst A signal 22 and the burst B signal 23 with the use of the position error signal (PES) sent from the amplifier 7 to determine a positional shift of the head 4 on a track T. According to this positional shift, the CPU 10 controls the driver 6 to control the movement of the slider S caused by the linear driving section 5 such that the head 4 performs correct tracking on the recording surface of the first-standard high-capacity medium.

This tracking control is not performed for the FD.

When a reproduction output is sent from the R/W switching unit 8 to the CPU 10, the signal obtained by excluding the signal (FIG. 7) in the servo area from the output is processed, converted to serial data, and sent to the data processing section of the host computer through an interface. When a signal is written into the first-standard high-capacity medium, the signal is sent from the host computer to the CPU 10 through the interface and the disk controller 9. The CPU 10 generates a recording format, and the record signal is sent from the R/W switching unit 8 to the head 4 through the amplifier 7. Also during a recording operation, the burst A signal 22 and the burst B signal 23 are detected in the servo area shown in FIG. 7 and tracking servo is applied.

In the present invention, when the inserted medium is determined to be either a floppy disk A or an another-standard high-capacity medium B by detecting an inside data zone (or outside data zone), the head 4 for the first-standard high-capacity medium can be used. In this case, the spindle motor 2 rotates the inserted disk at a high speed of 3600 rpm. And then, whether the output of the head 4 is obtained at the "d" position or the "b" position (alternatively, the "c" position or the "e" position) shown in FIG. 1 is determined. The CPU 10 serving as a signal processing section can be used for this determination. In other words, since the CPU 10 serves as a detection section for detecting the burst A signal 22 and the burst B signal 23, the envelope of a signal from the medium can be detected by the use of this function. According to the detection of a reproduction envelope output from the head 4 and head position information sent from the linear sensor 5b, the CPU 10 detects the inside data zone (or the outside data zone) to determine whether the medium 1 is an FD or an another-standard high-capacity medium.

The FD head 3 can also be used to detect the position of the inside data zone or the outside data zone. Since the drive for the first-standard high-capacity medium is not provided with a circuit for detecting only a head output, at a reproduction path for the head 3, an envelope detection circuit 13 is added as shown in FIG. 2A. Alternatively, a switching unit for switching the use of the envelope detection circuit 13 as required is provided. The envelope detection circuit 13 determines whether a reproduction output is obtained while the slider S is being moved, this information is sent to the CPU 10, and the head position information sent from the linear sensor 5b is also sent to the CPU 10 to detect the position where the reproduction envelope is detected (the position of the inside data zone).

As described above, when a disk type is determined by detecting an end section of the data zone, if the head 4 for the first-standard high-capacity medium is used, the loaded medium is rotated at a high speed of 3600 rpm; and if the FD head 3 is used, the loaded medium is rotated at a low speed of 300 rpm. In a drive for the first-standard high-capacity medium, since the loaded medium is driven at both rotation frequencies immediately when the medium is loaded, either head can be used.

Figure 8:
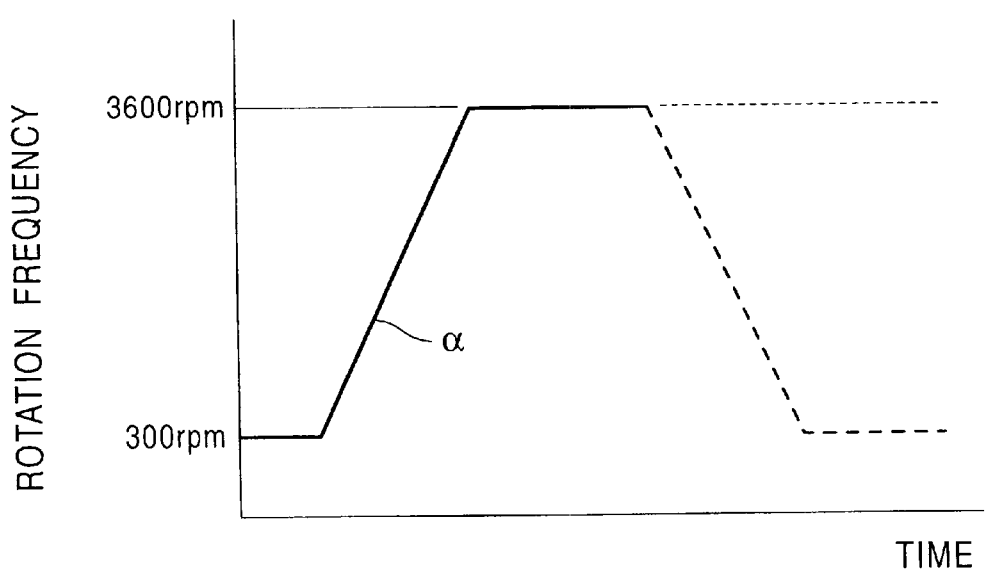
FIG. 8 is a chart indicating the transition of the rotation frequency of a spindle motor, achieved after a medium is loaded.

Specifically, as shown in FIG. 8, when a hub at the center of the disk is placed on the turntable on the spindle motor 2 in this drive, the turntable is first rotated at about 300 rpm and a driving pin on the turntable fits into the driven hole of the hub. And then the rotation frequency increases to about 3600 rpm, and the turntable centers the hub with the use of inertia moment in an acceleration period α. When the loaded medium is determined to be a first-standard high-capacity medium, driving at 3600 rpm continues and an operation such as reproduction starts. When the loaded medium is determined to be an FD, the rotation frequency is reduced to 300 rpm and then an operation such as reproduction starts.

When it is not clear that the loaded medium is an FD or an another-standard high-capacity medium, after the acceleration period a, shown in FIG. 8, is finished, determination needs to be performed with the use of the head 4 at a rotation frequency of 3600 rpm or with the use of the head 3 at a reduced rotation frequency of 300 rpm.

Figure 3:
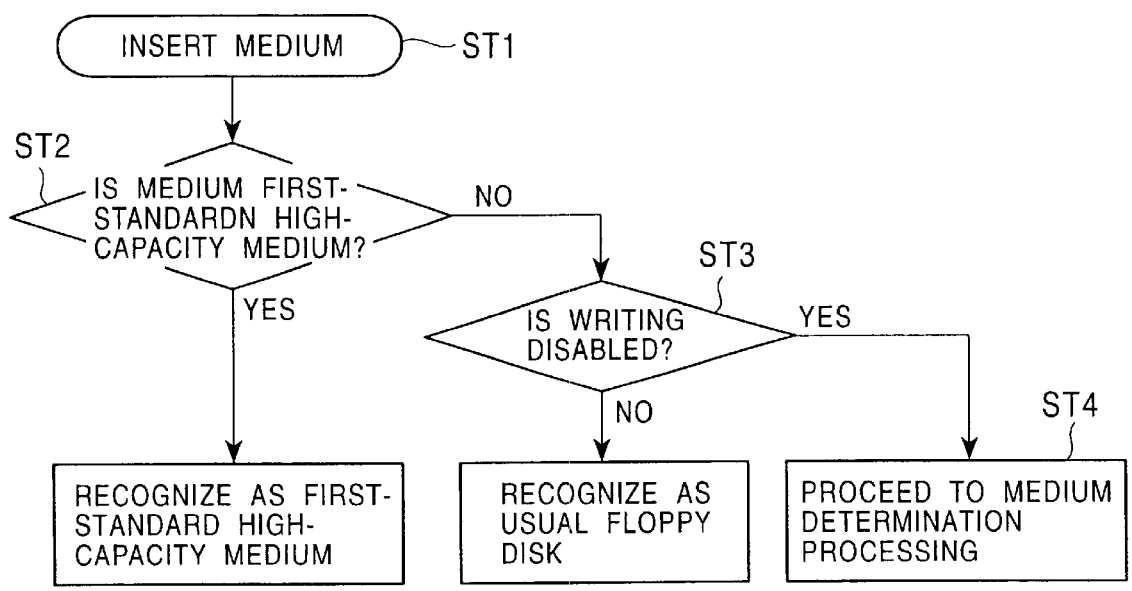
FIG. 3 is a flowchart of processing for determining whether the inserted medium is a first-standard high-capacity medium, in a procedure to be performed immediately after the medium is inserted.
Figure 4:
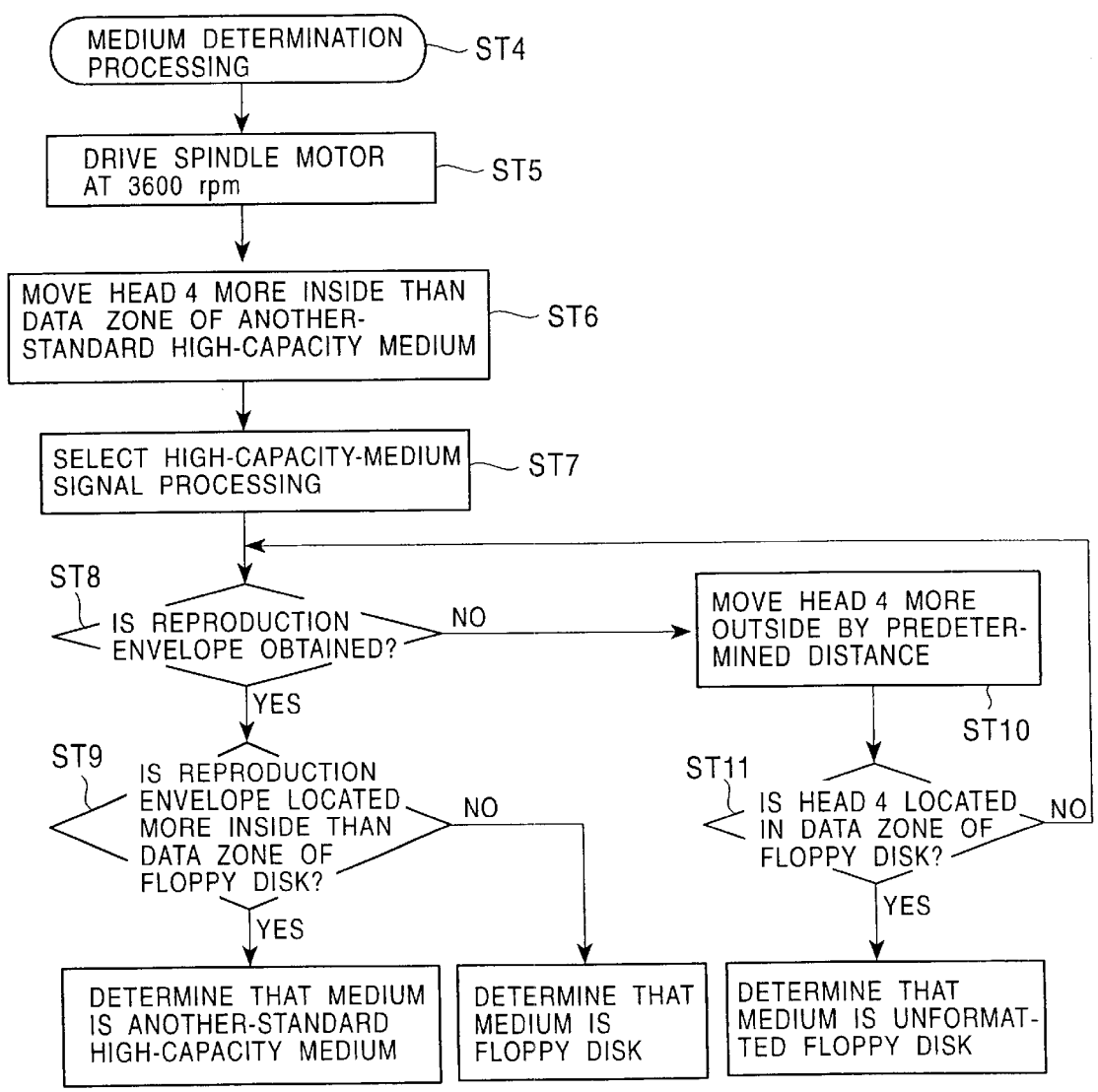
FIG. 4 is a flowchart of medium determination processing according to a first embodiment.
Figure 5:
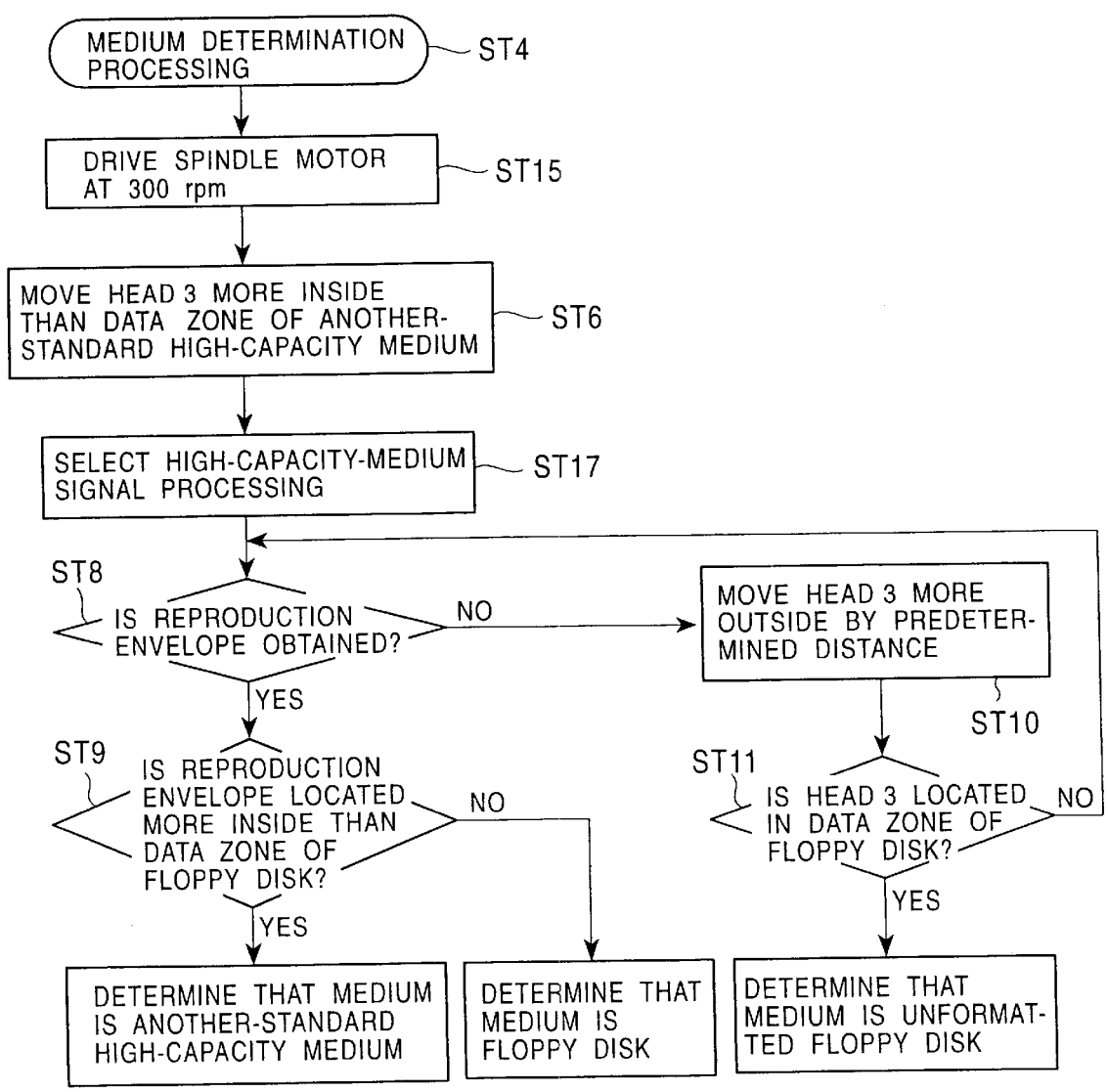
FIG. 5 is a flowchart of medium determination processing according to a second embodiment.
Figure 6:
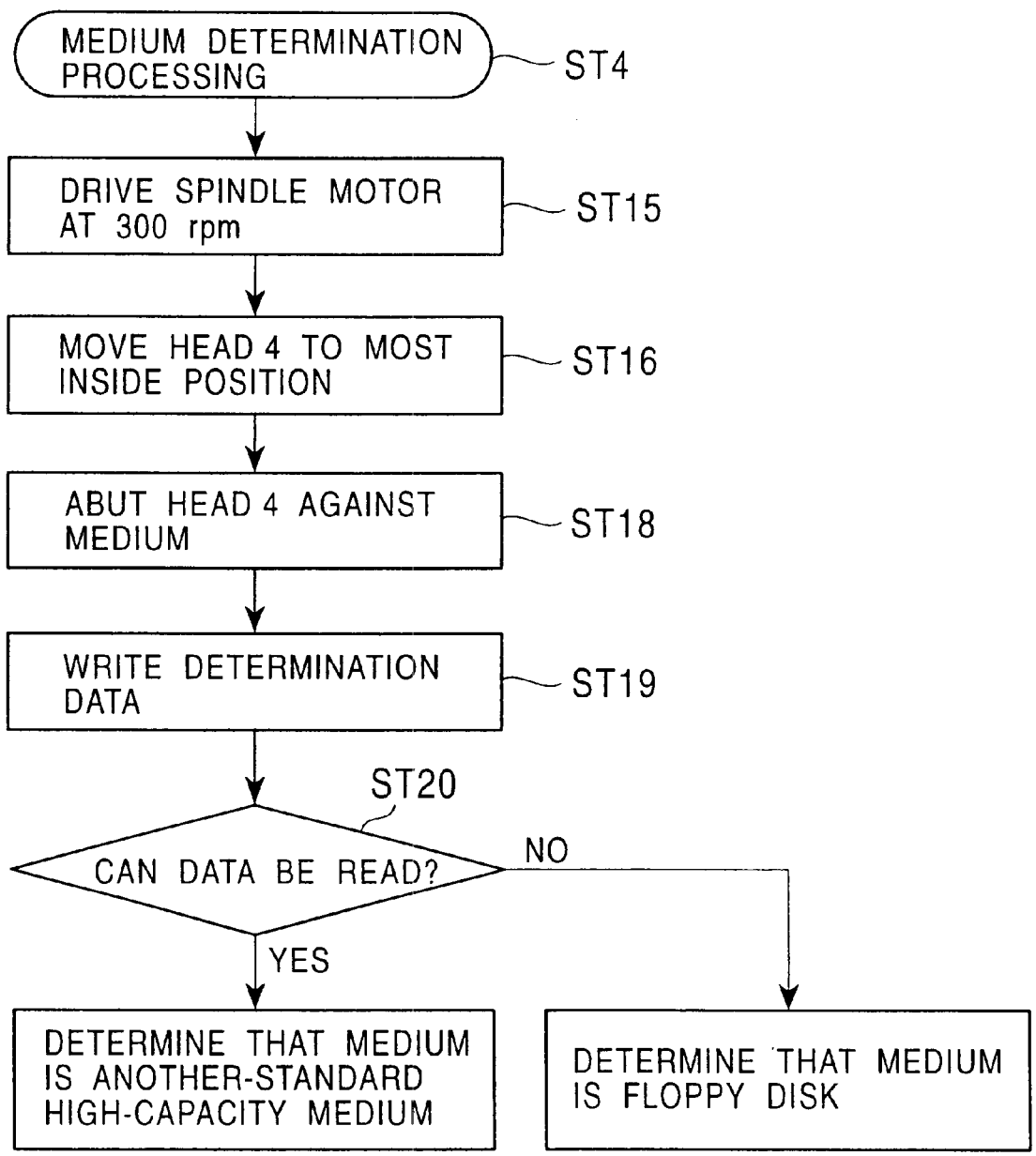
FIG. 6 is a flowchart of medium determination processing according to a third embodiment.

FIG. 3 is a flowchart of a procedure for determining whether the inserted medium is a first-standard high-capacity medium immediately after the medium is inserted. FIGS. 4 to 6 are flowcharts of medium determination processing. It is assumed that the first-standard high-capacity medium and the another-standard high-capacity medium have been formatted.

When a medium is inserted to a drive in a step 1 (ST1) shown in FIG. 3, it is determined whether the medium is a first-standard high-capacity medium (ST2). A switch or a sensor (not shown) detects a detection hole of the hard case in which the inserted medium is accommodated and the information is sent to the CPU 10 to determine the type of the medium.

When the inserted medium is recognized as a first-standard high-capacity medium in ST2, the medium is determined to be a first-standard high-capacity medium. When the inserted medium is not recognized as a first-standard high-capacity medium, it is then determined whether a square hole indicating a write enable condition is formed at the hard case in which the medium is accommodated (ST3) by detecting the hole with the use of a switch or a sensor provided for the drive.

When the square hole is detected, which means the medium is in a write enable condition, the medium is determined to be a usual 1/2-MB FD. In this case, an FD processing operation starts. When the square hole is not detected, which means the medium is in a write disable condition, since it cannot be determined whether the medium is an FD or an another-standard high-capacity medium, the procedure proceeds to medium determination processing (ST4).

FIG. 4 is a flowchart of a method for distinguishing media by detecting a difference between the radial positions of the data zones (formatted zones) of the media. FIG. 4 is applied to a case in which this distinction is performed by the use of the head 4 for a high-capacity (200 MB) medium with the detection of inside data zones.

In the medium determination processing (ST4) shown in FIG. 4, the spindle motor is driven at 3600 rpm (ST5), the head is moved to a more inside position than the data zone of the another-standard high-capacity medium shown in FIG. 1 (ST6), and processing for a high-capacity medium signal is selected (ST7). In other words, with a signal path shown in FIG. 2A formed of the amplifier 7, the R/W switching unit 8, the disk controller 9, and the CPU 10, a determination processing is performed.

Reproduction is then performed by the use of the head 4. It is determined whether a reproduction envelope (reproduction output) is obtained (ST8). As described above, the envelope is detected by the detection processing section for the burst A signal and the burst B signal in the CPU 10. When a reproduction envelope is obtained in ST8, it is determined whether the reproduction envelope is positioned more inside than the FD data zone (ST9). When it is positioned more inside, the medium is determined to be an another-standard high-capacity medium. When it is not positioned more inside, the medium is determined to be an FD. The head position is measured according to the detection output of the linear sensor 5b.

When a reproduction envelope is not obtained in ST8, the head 4 is moved more outside by a predetermined distance (ST10). It is determined whether the head 4 is positioned within the FD data zone (ST11). When the head 4 is not positioned within the data zone in ST11, it is again determined whether a reproduction envelope is obtained. If a reproduction envelope is not obtained at this point of time, the head 4 is again moved more outside by the predetermined distance. It is determined whether the head 4 is positioned within the FD data zone. The operations (ST8, ST10, and ST11) are repeated until the head 4 is positioned within the FD data zone. When the head 4 becomes positioned within the data zone, the medium is determined to be an unformatted FD.

FIG. 5 is a flowchart of medium determination processing with the use of a lower-compatible head 3.

In this flowchart, the spindle motor is rotated at 300 rpm (ST15), and the head is moved to a more inside position than the data zone of the another-standard high-capacity medium shown in FIG. 1 (ST6). In this case, processing for a low-capacity medium signal is selected. In other words, the envelope detection circuit 13 added as shown in FIG. 2A is made effective (ST17). The head 3 is then moved in the outside direction and it is determined whether a reproduction envelope is obtained (ST8). When a reproduction envelope is obtained at a position more inside than the innermost position of the FD data zone, the medium is determined to be an another-standard high-capacity medium. When it is not positioned more inside, the medium is determined to be an FD.

When a reproduction envelope is not obtained in ST8, the head 3 is moved more outside by a predetermined distance. It is determined whether the head 3 is positioned within the FD data zone. When the head 3 is not positioned within the data zone, the procedure returns to ST8 again and it is determined whether a reproduction envelope is obtained. If a reproduction envelope is not obtained at this point of time, the head 3 is again moved more outside by the predetermined distance. It is determined whether the head 3 is positioned within the FD data zone. These operations are repeated until the head 3 becomes positioned within the FD data zone. When a reproduction envelope is not obtained even if the head 3 is moved to a position within the FD data zone, the medium is determined to be an unformatted FD.

FIG. 6 is a flowchart of medium determination processing in which determination data is written into an unused area on the loaded medium and then the medium is identified by determining whether the determination data can be read.

In FIG. 6, the head 4 for the first-standard high-capacity medium is used. The spindle motor is rotated at 300 rpm (ST15). It may be rotated at 3600 rpm. The head 4 is moved to the innermost position where the head 4 can move (in an unused area E) (ST16), the head 4 is butted against the medium (ST18), and determination data is written into the medium (ST19). The determination data is recorded with the use of a much higher frequency than that for FD data. It is then determined whether the written determination data can be read (ST20). When it can be read, the medium is determined to be an another-standard high-capacity medium. When the data cannot be read, the medium is determined to be an FD.

Since the FD is for low recording density, it has a low coercive force. In addition, it has a thick magnetic layer. Therefore, remanence is small for a high-frequency signal. Consequently, the FD and the another-standard high-capacity medium can be distinguished by determining whether high-frequency determination data is recorded or not.

A medium distinguishing method according to the present invention is not limited to those described in the above embodiments in which a difference in the radii of the data zones is used. A medium distinguishing method may be implemented by the use of a difference in track pitch.

What is claimed is:

1. A method that identifies a low-capacity, a high-capacity, and a higher-capacity disk in a disk drive comprising:

analyzing a case of a disk for an identifier that indicates a density of the disk as being one of either a low-capacity disk or a higher-capacity disk;

when the identifier does not indicate the density of the disk, positioning a head on the disk outside an expected location of a data zone of a higher-capacity disk;

operating the head in a read mode;

moving the head along a radial path toward the data zone of the disk; and analyzing a position and an output of the head relative to an expected location of a data zone of a low-capacity disk to verify a location of the data zone of the disk as that being for a low-capacity disk or a high-capacity disk.

2. A method according to claim 1, wherein the act of analyzing the position of the head comprises subtracting a radial distance of the location of the data zone of the disk from a radial distance of the expected location of the data zone of the low-capacity disk.

3. A medium distinguishing method according to claim 1, wherein the act of analyzing the position of the head comprises detecting a difference in a track pitch between the data zone of the disk and the expected data zone of the low-capacity disk.

4. A method according to claim 1, wherein the act of positioning the head comprises moving the head toward one of an inside end section and an outside end section of the expected location of the data zone of the higher-capacity disk.

5. A method according to claim 4, wherein a reproduction operation is performed through the head configured to read the high-capacity disk, and the output of the head is detected by the use of a tracking-servo-signal detection section.

6. A method according to claim 4, wherein a reproduction operation is performed through the head configured to read the low-capacity disk, and the output of the head is detected by the use of an envelope detection section.

7. A method according to claim 1, wherein the act of positioning the head positions the head in a gap on the disk between a center portion of the disk and the expected location of the data zone of the higher-capacity disk.

* * * * *